United States Patent [19]

Shimizu et al.

[11] 3,952,090

[45] Apr. 20, 1976

[54] METHOD OF MAKING FIBROUS ALKALI TITANATES

[75] Inventors: Tadao Shimizu, Tachikawa; Koshiro Hashimoto, Tokyo; Hiroaki Yanagida, Kashiwa, all of Japan

[73] Assignee: Matsushita Electric Industrial Co., Ltd., Japan

[22] Filed: Oct. 23, 1974

[21] Appl. No.: 517,436

[52] U.S. Cl.................................. 423/598; 106/50; 65/33
[51] Int. Cl.².......................................... C01G 23/00
[58] Field of Search............ 423/598; 106/50; 65/33

[56] References Cited
UNITED STATES PATENTS

| | | | |
|---|---|---|---|
| 3,328,117 | 6/1967 | Emslic et al. | 423/598 |
| 3,331,658 | 7/1967 | Lewis et al. | 423/598 |
| 3,380,847 | 4/1968 | Lewis et al. | 423/598 |
| 3,737,520 | 6/1973 | Jacobson | 423/598 |
| 3,760,068 | 9/1973 | Winter et al. | 423/598 |
| 3,873,328 | 3/1975 | Brueggemann et al. | 106/50 |
| 3,901,719 | 8/1975 | Brydges et al. | 65/33 |

FOREIGN PATENTS OR APPLICATIONS

| | | | |
|---|---|---|---|
| 204,997 | 1/1968 | U.S.S.R. | 423/598 |
| 1,047,183 | 12/1958 | Germany | 423/598 |
| 782,472 | 9/1957 | United Kingdom | 423/598 |
| 552,245 | 1/1958 | Canada | 423/598 |

*Primary Examiner*—Herbert T. Carter
*Attorney, Agent, or Firm*—Wenderoth, Lind & Ponack

[57] ABSTRACT

A method of making fibrous alkali titanate comprising the steps of melting a mixture of titanium compound and alkali compound at a temperature higher than 1000°C, cooling the melted product so as to form a glassy material, pulverizing the resultant glassy material, treating the pulverized powder in an autoclave in the presence of water at a temperature at least higher than 350°C so as to form fibrous alkali titanate, and washing the treated product.

10 Claims, No Drawings

METHOD OF MAKING FIBROUS ALKALI TITANATES

This invention relates to a method of making fibrous alkali titanates, and more particularly to an improved method of making fibrous alkali titanates by using a hydrothermal reaction.

Fibrous alkali titanates, which are inorganic fibrous materials, are excellent thermal insulators at high temperature and are expected to be effectively used as various insulating means and composite materials.

Conventionally, there are known several methods of making such fibrous alkali titanates. For example, U.S. Pat. No. 2,833,620 discloses a method of making fibrous alkali titanates by a hydrothermal reaction of a mixture of water-soluble alkali metal compound and titanium oxide at a temperature higher than 400°C and at a kg/cm² higher than 200 pressures.

Also, U.S. Pat. No. 2,841,470 discloses a method of obtaining fibrous crystals by melting a halogenide of alkali metal at a temperature lower than 1200°C and dissolving titanium dioxide or nonfibrous alkali titanate into the melted halogenide up to saturation. Further, U.S. Pat. No. 3,328,117 discloses a method of making fibrous alkali titanates by the steps of mixing an alkali metal compound containing oxygen with titanium compound containing oxygen at a drying state, pressing the mixture, calcining the pressed body at a temperature of 200 to 1150°C and separating the fibrous material from the calcined product.

The method of making fibrous alkali titanates by means of a hydrothermal reaction is better, especially for providing hexaalkali titanate, $M_2O \cdot 6TiO_2$ (wherein M designates one or more than one elements selected from Na, K, Rb and Cs) which are superior in insulating property at a high temperature. However, this method has a defect that in using titanium oxide or titanium hydroxide, the reaction is not completed even after a long time at a high temperature and a high pressure, so that there remains a part of the starting materials which are not reacted and so it is difficult to obtain pure fibrous product. The reasons why the reaction is not completed and an impurity remains in the conventional hydrothermal synthetic method are considered to be as follows:

1. The reaction product grows from the wall of an autoclave into a film state, at the upper portion of starting materials charged in the autoclave, and the film prevents further movement of the reactive materials. Therefore, the reaction is not complete.

2. As the powdered starting materials are apt to aggregate in the autoclave, the reaction is not complete due to incomplete contact between the powder and hot water. Because of these phenomena, there is caused a further problem in that even though the autoclave is kept at a constant temperature, the fibrous products have different lengths from each other depending upon the place in the autoclave. In order to eliminate these problems, in the conventional hydrothermal synthetic method, a complex and difficult operation is required such as stirring the materials in the autoclave during the reaction.

The method disclosed in U.S. Pat. No. 2,841,470 has problems of difficult operation due to use of the process of melting halogenide or fluoride of alkali metal at a high temperature and of usually producing both hexatitanate and tetratitanate, $M_2O \cdot 4TiO_2$. Besides, although the method disclosed in U.S. Pat. No. 3,328,117 is suitable for industrial manufacture, there is still a problem that the thermal property of the product is rather degraded at a high temperature due to the above described coexistence of hexatitanate and tetratitanate.

Therefore, an object of the present invention is to provide a novel and improved method of making fibrous alkali titanate easily and effectively by means of hydrothermal synthesis.

Another object of the invention is to provide a method of making fibrous alkali titanates which are uniform in composition and form.

A further object of the invention is to provide a method of making fibrous alkali titanate, especially pure and uniform fibrous hexatitanate with a high yield.

A still further object of the invention is to provide a method of making non-crystalline fibrous alkali titanate, which can be changed to crystalline fiber by heating.

These objects can be achieved by providing the method of the invention, which comprises the steps of melting a mixture of titanium compound and alkali compound at a temperature higher than 1000°C, cooling the melted product so as to form a glassy material, i.e. vitreous material, pulverizing said glassy material, treating the pulverized powder in an autoclave under the presence of water at a temperature of at least higher than 350°C so as to form fibrous alkali titanate, and washing the resultant product.

These and other objects and the features of the present invention become clear from consideration of the following detailed description.

The inventors have found that in the conventional hydrothermal synthetic reaction of titanium dioxide or titanium hydroxide, the yield in producing alkali titanate can be increased by adding about 1.0 weight % of fibrous alkali titanate crystal as a seed crystal. From this fact, it is considered that in the reaction of producing the fibrous alkali titanate by hydrothermal synthesis, alkali ion and titanium ion separate into the aqueous solution, respectively, from the starting materials and these ions associate with each other, and then there occurs a reaction producing a complex ion having a structure similar to that of fibrous alkali titanate crystal, or that production of crystal nucleus of fibrous alkali titanate is the rate-determining step of the reaction. Therefore, according to the present invention, it is found that in order to eliminate problems (1) and (2) of the conventional hydrothermal synthetic method described hereinbefore, it is effective to use a glassy material which is prepared by melting a mixture of titanium compound and alkali compound as the starting material in the hydrothermal synthetic method.

That is, the above-mentioned glassy material is effective to more uniformly and rapidly advance the hydrothermal reaction, compared with the conventional method because of the following reasons:

i. Alkali and titanium are contained and distributed uniformly in the glassy material.

ii. The glassy material dissolves into hot-water more easily than crystalline material.

iii. In the glassy material, there are contained the bonding states which are similar to the complex ion having a structure similar to that of fibrous alkali titanate crystal, which is the rate-determining factor of the reaction of producing alkali titanate.

iv. Because of the glassy material, when it is pulverized into powder, there is provided better contact with hot water in the hydrothermal reaction. Further, it does not require stirring, in contrast to the conventional method, and it is possible to produce fibrous alkali titanate containing no non-fibrous crystal impurity.

The glassy material, designated herewith in the invention, containing titanium and alkali metal is prepared as follows. A titanium compound such as $TiO_2$ and $Ti_2O_3$, $H_4TiO_4$, $H_2TiO_3$, etc., which becomes $TiO_2$ by heating and an alkali compound such as $M(OH)$, $M_2CO_3$ (M: Na, K, Rb or Cs) which contains one or more than one elements of Na, K, Rb and Cs and which changes into $M_2O$ are measured in a molar ratio of $M_2O$ to $TiO_2$ at least higher than 1.0, and they are well mixed. If the molar ratio is less than 1.0, a final product contains unfavorably a non-fibrous material such as rutile. Then, the mixture is melted by heating. The melting temperature is selected depending upon the above described composition, and it is desirable to melt the mixture at a temperature as high as possible so as to provide a uniform composition. According to the present invention, the desirable melting temperature is at least higher than 1000°C, and preferably higher than 1200°C. The uniformly melted product is cooled so as to form a desired glassy material. If necessary, the melted product may be quenched by allowing it to flow over a stainless steel plate.

For the starting material used in the method of the invention, it is desirable that the glassy material prepared as described above does not contain crystalline material such as $TiO_2$ and $K_2TiO_4$. However, from a practical standpoint, it is allowed to contain a small amount of crystal in an amount of less than several percent. Such a small amount of crystal contained in the glassy material of the invention increases in accordance with increase of the amount of $TiO_2$ contained in the first mixture. Also, it is caused in case of incomplete melting due to incomplete temperature and time. Because of existence of the crystal, alkali titanate produced by hydrothermal reaction contains non-fibrous alkali titanate.

When the glassy material prepared as described above is cooled, it is usually semi-transparent white or light yellow in color, and it has a rather high hygroscopicity.

Next, the cooled glassy material is put into an autoclave together with water for hydrothermal reaction. At this time, it is desirable to pulverize the glassy material into powder of a suitable particle size, for example about 50 mesh, so as to advance the reaction and to increase thereby the yield of the fibrous product. Further, if necessary, by providing a distribution in the particle size of the pulverized powder, there is obtained a long fibrous product. Moreover, to further advance the reaction it is effective to put such pulverized powder into an autoclave and add thereto an aqueous solution of MOH and to granulate the powder into a suitable size by stirring the solution.

It is desirable, for the method of the invention, to carry out hydrothermal synthesis at a temperature at least higher than 350°C, preferably at a temperature of 400° to 500°C. In case of the reaction at a temperature lower than 350°C, the yield rate is low and non-fibrous impurity is contained in the reaction product. Although much higher temperature is operable for the reaction, a temperature lower than 500°C is convenient for operating the autoclave and for the life of the autoclave.

The reaction time depends upon the reaction temperature, and a time longer than 30 minutes is enough for the reaction. A reaction pressure higher than 100 atmospheres is employed, and usually, the practical optimum condition is about 500 atmospheric pressures. Therefore, it is desirable for operation that the volume of the glassy material and water to be put into the autoclave be about 60% of the inner volume of the autoclave.

Further, according to the present invention, it is found that by previously adding crystallized fibrous alkali titanate to the starting material for hydrothermal reaction, the fibrous material is easily produced with a higher yield. At this time, the amount of the fibrous material to be added is preferably about 5 weight % of the glassy material. Addition of such a crystal seed is also effective for making the fibrous product uniform.

The fibrous material produced by the method of the invention basically has three forms; a fibrous product having the same crystal structure as that of tetratitanate $M_2O.4TiO_2$ (ref. Berry et al, J. Inorg. Nuclear Chem. 14 pp 231–9 (1960)), a fibrous product having the same crystal structure as that of hexatitanate $M_2O.6TiO_2$ (ref. Plumley and Orr, J. Am. Chem. Soc. 83 pp 1289–91 (1961)), and a non-crystalline fibrous product. By microscopic or scanning type electronmicroscopic observation, it is known that all of these products have a fibrous form of less than $10\mu m$ in average diameter and a length to diameter ratio of more than 5.

The resultant product by the method of the invention is analyzed by means of powder X-ray diffraction method using $CuK\alpha$ line. At this time, as the product has a fibrous form, the sample to be analyzed should be charged with care to avoid directionality. Hexatitanate ($M_2Ti_6O_{13}$=$M_2O.6TiO_2$) having crystallinity, which is synthesized as a reference material, is fired at 950°C for 1 hour and diluted with $TiO_2$ (Anatase). Then, with use of the resultant product, the intensity of the highest peak, (200)-diffraction line of $K_2Ti_6O_{13}$ is quantitatively analyzed so as to make a calibration curve of $M_2Ti_6O_{13}$, and by this calibration curve the amount of $M_2Ti_6O_{13}$ in the reaction product is analyzed. On the other hand, the amounts of M and Ti are analyzed by a chemical analysis of the reaction product. From these analyses, the composition rate of the reaction product is confirmed.

The products made by the method of the invention have all the fibrous forms as described hereinbefore and basically they are $M_2O.nTiO_2$ ($6 \leq n \leq 7$) having the hexatitanate crystal structure or $M_2O.nTiO_2$ ($2<n<6$) having the tetratitanate crystal structure. Especially, it is one of the features of the invention that the products are proven, by X-ray diffraction, to completely be non-crystalline fibrous material. These non-crystalline products are changed into hexatitanate and tetratitanate crystal structures, respectively, depending upon their constituents by heating. For example, when the amounts of M and Ti are in the above described hexatitanate range, it becomes fibrous powder of completely hexatitanate crystal by heating at 950°C for 1 hour, and further the fibrous form is not changed even by this heating, i.e., it is in the same form as before.

Embodiments of the invention will become clearer from the following examples, which should not be considered limitative of the scope of the invention.

EXAMPLE 1

Titanium dioxide and potassium carbonate of reagent grade were measured so as to be in a molar ratio of 1.5 in terms of $K_2O/TiO_2$ and are well mixed. Then, the mixture was put in a crucible made of chamotte and heated about at 1350°C in a gas furnace. After being kept for 30 minutes at that temperature, the melted product was quenched onto a stainless steel plate and was quenched thereby. The quenched product was a semitransparent glass light yellow in color and it was hygroscopic.

Next, the quenched product was pulverized into powder of less than 100 mesh, and it was put in a Morey type autoclave made of Hastelloy having an inner volume of 35 ml, together with a solution of 0.5N potassium hydroxide, in an amount of 60% of the inner volume of the autoclave. The amount of the glass put in the autoclave was 3gr. Then, the autoclave was set in an electric furnace and heated to 500°C. By keeping the autoclave at this temperature for 3, 5, 10 and 20 hours, there were prepared four kinds of samples. After the reaction, the reaction products were quenched and the samples were taken out. The samples were well washed by distilled water and dryed at 120°C for 24 hours.

Table 1 shows the result of the quantitative analysis of the resultant product by means of X-ray powder diffraction method. Further, from microscopic observation, it was known that all of the product were fibrous having an average length of 10 to 50$\mu$ and a length to width ratio of about 50 to 100 and they did not contain any material of the other forms.

Table 1

| | The amount of $K_2Ti_6O_{13}$ in the resultant product (the remainder is the amount of non-crystalline material). | |
|---|---|---|
| reaction time (hr) | amount of $K_2Ti_6O_{13}$(%) | amount of $K_2Ti_6O_3$ after heating at 950°C, for 1hr, (%) |
| 3 | 60 | 80 |
| 5 | 75 | 100 |
| 10 | 90 | 100 |
| 20 | 100 | 100 |

EXAMPLE 2

The product provided by Example 1 was put in a porcelain crucible and heated at 950°C for 1 hour in the electric furnace. After that, it was cooled. Although the result of microscopic observation of the cooled product showed that the form thereof did not change before heating, it was known that the amount of $K_2Ti_6O_{13}$ was much increased, as shown in Table 1, by the quantitative analysis by the X-ray powder method.

EXAMPLE 3

The glassy powder was made by a similar method to that of Example 1, and it was put in the same autoclave as used in Example together with pure water. After reaction for 1 hour at a heating temperature of 400°C, the product was cooled, washed and dried. The resultant product was a fibrous material having the average length of about 10$\mu$ and the length to width ratio of about 30, and it was completely noncrystalline according to the result of X-ray analysis.

EXAMPLE 4

5 weight % of fibrous crystals of $K_2Ti_6O_{13}$ and $K_2Ti_4O_9$ having a length of about 10$\mu$ and a length to width ratio of about 20 were added, as a seed crystal, to the glassy material prepared as described in Example 1, respectively, and there were made two kinds of samples by treating the mixtures similarly to Example 1 with the reaction time of 3 hours. Each of the synthesized products was a fibrous material having the almost same form as that of Example 1. From the result of the X-ray analysis, it was known that these products were the crystals of $K_2Ti_6O_{13}$ and $K_2Ti_4O_9$, respectively.

EXAMPLE 5

The glassy powder prepared similarly as described in Example 1 was put in the autoclave together with solutions of 0.5N sodium hydroxide, 0.5N rubidium hydroxide and 0.5N cesium hydroxide, and the reaction was carried out for 20 hours with the same conditions as those of Example 1. All of the resultant products were fibrous, and from analysis it was confirmed that there was produced an alkali titanate comprising K as alkali and containing Na, Rb and Cs.

EXAMPLE 6

Potassium carbonate in Example 1 was replaced by sodium carbonate, and the fibrous product was produced under the same conditions in Example 1 by the reaction time of 20 hours. From the X-ray analysis, it was confirmed that the resultant product was completely composed of $Na_2Ti_6O_{13}$ and was fibrous with the average length of about 30$\mu$ and the length to width ratio of about 30.

EXAMPLE 7

A mixture of $TiO_2$ and $K_2CO_3$, in a molar ratio of 3 in terms of $K_2O/TiO_2$, was melted at 1000°C and quenched so as to form a glassy material. The resultant glassy material was pulverized, and the pulverized powder was put in the autoclave together with aqueous solution of KOH. After carrying out the reaction at 350°C for 20 hours, the resultant product was taken out and analyzed. The product was fibrous material consisting of $K_2Ti_4O_9$ crystal and it did not contain any material of the other form or other crystal type.

EXAMPLE 8

$K_2CO_3$ and $TiO_2$ were mixed in the molar ratio of 1.0 in terms of $K_2O/TiO_2$, and the glassy material was made similarly as in Example 1. Then, it was treated in the autoclave similarly as in Example 1 except for the treating time of 20 hours. The resultant product was completely fibrous, and it was a pure $K_2Ti_6O_{13}$ crystal according to the X-ray analysis.

What is claimed is:

1. A method of making fibrous alkali titanates comprising the steps of: melting a mixture of a titanium compound and an alkali metal compound at a temperature higher than 1000°C, the alkali metal in said alkali metal compound being a member selected from the group consisting of Na, K, Rb and Cs, and said mixture containing said alkali metal compound and titanium compound in a molar ratio of higher than 1.0 in terms of $M_2O$: $TiO_2$ where M designates Na, K, Rb or Cs; cooling the thus melted product so as to form a vitreous material; pulverizing the thus cooled product into a powder; treating the thus obtained powder in an autoclave in the presence of water at a temperature higher than 350°C and a pressure higher than 100 atmospheres so as to form fibrous alkali titanate; and washing the thus obtained product.

2. A method of making fibrous alkali titanates as claimed in claim 1, wherein said mixture is melted at a temperature higher than 1200°C.

3. A method of making fibrous alkali titanates as claimed in claim 1, wherein said pulverized powder is treated in said autoclave at a temperature of 400° to 500°C.

4. A method of making fibrous alkali titanates claimed in claim 1, wherein the amount of said pulverized powder in said autoclave is less than 60 volume % of the inner volume of said autoclave.

5. A method of making fibrous alkali titanates as claimed in claim 1, wherein said method further comprises the step of adding a crystalline fiber of alkali titanate to said pulverized powder, after the step of pulverizing said cooled product.

6. A method of making fibrous alkali titanates as claimed in claim 5, wherein said crystalline fiber of alkali titanate to be added has the formula of $MO_2 \cdot nTiO_2$, where $n$ is in the range of $6 \leq n \leq 7$.

7. A method of making fibrous alkali titanate as claimed in claim 5, wherein said crystalline fiber of alkali titanate to be added has the formula of $MO_2 \cdot nTiO_2$, where $n$ is in the range of $2 < n < 6$.

8. A method of making fibrous alkali titanate as claimed in claim 5, wherein the added amount of said crystalline fiber of alkali titanate is less than 5 weight % of said cooled product.

9. A method of making fibrous alkali titanate as claimed in claim 5, wherein said pulverized powder and said added crystalline fiber of alkali titanate are treated in said autoclave at a temperature of 400° to 500°C.

10. A method of making fibrous alkali titanate as claimed in claim 5, wherein the amounts of said pulverized powder and said crystalline fiber of alkali titanate are less than 60 volume % of the inner volume of said autoclave.

* * * * *